United States Patent
Maxson et al.

(10) Patent No.: US 10,601,465 B2
(45) Date of Patent: *Mar. 24, 2020

(54) NON-DISRUPTIVE SWEEP MEASUREMENT USING COHERENT DETECTION

(71) Applicant: VIAVI SOLUTIONS INC., San Jose, CA (US)

(72) Inventors: Ben Maxson, Beech Grove, IN (US); Koji Okamoto, Indianapolis, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,319

(22) Filed: Mar. 19, 2019

(65) Prior Publication Data

US 2019/0319669 A1 Oct. 17, 2019

Related U.S. Application Data

(63) Continuation of application No. 14/326,589, filed on Jul. 9, 2014, now Pat. No. 10,284,257.

(60) Provisional application No. 61/844,218, filed on Jul. 9, 2013.

(51) Int. Cl.
| | |
|---|---|
| *H04N 7/173* | (2011.01) |
| *H04B 3/46* | (2015.01) |
| *H04N 17/00* | (2006.01) |
| *H04N 21/443* | (2011.01) |

(52) U.S. Cl.
CPC ............... *H04B 3/46* (2013.01); *H04N 17/00* (2013.01); *H04N 21/4432* (2013.01)

(58) Field of Classification Search
CPC ................. H04N 17/004; H04N 21/4432
USPC ........................................................ 725/107
See application file for complete search history.

(56) References Cited

U.S. PATENT DOCUMENTS

| | | |
|---|---|---|
| 6,414,960 B1 | 7/2002 | Kuhn |
| 6,618,148 B1 | 9/2003 | Pilgrim |
| 8,532,488 B2 | 9/2013 | Nielsen |
| 8,841,923 B1 | 9/2014 | Vanwiggeren |
| 2004/0214603 A1 | 10/2004 | Tanabe |
| 2006/0098749 A1 | 5/2006 | Sung |
| 2008/0064349 A1 | 3/2008 | Flask |
| 2010/0013407 A1 | 1/2010 | Kastle |
| 2012/0213083 A1 | 8/2012 | Shafer |
| 2013/0182753 A1 | 7/2013 | Delforce |
| 2014/0133321 A1 | 5/2014 | Luong |
| 2014/0167793 A1 | 6/2014 | Vanden |
| 2014/0282783 A1 | 9/2014 | Totten |

*Primary Examiner* — Pankaj Kumar
*Assistant Examiner* — Sahar Aqil Riaz
(74) *Attorney, Agent, or Firm* — Mannava & Kang, P.C.

(57) ABSTRACT

Non-disruptive sweep measurements using low power coherent signals overcome the limitations of prior art frequency response systems for cable networks. Modulated or unmodulated, e.g. continuous wave (CW), test signals are transmitted into the network at a first or input point (input point is in the head end for forward sweep; input point is in the field for reverse sweep). The test signals are transmitted continuously at multiple frequencies, so as a composite they form a wideband, OFDM-like (orthogonal frequency-division multiplexing) waveform. A receiver at a second or output point generates power reading measurements, from which the frequency response of the network is produced.

20 Claims, 16 Drawing Sheets

NON-DISRUPTIVE SWEEP MEASUREMENT USING COHERENT DETECTION

CROSS-REFERENCE TO RELATED APPLICATIONS

The present invention is a Continuation of commonly assigned and co-pending U.S. patent application Ser. No. 14/326,589, filed Jul. 9, 2014, which claims priority from United Serial. Patent Application No. 61/844,218 filed, Jul. 9 2013, the disclosures of which are hereby incorporated herein by reference in their entireties.

TECHNICAL FIELD

The present disclosure relates to measuring the frequency response of a cable (CATV) network, and in particular to a non-disruptive method of measuring the frequency response of a cable network using signals of low power.

BACKGROUND

Upstream and downstream measurements are used to install, adjust, and troubleshoot amplifiers and other plant components on the CATV network. Traditionally, using a handheld test meter, a test signal of known amplitude is injected onto the network. The test signal propagates through the CATV network, passing through various active and passive components. A technician measures the power level of the test signal with a receiver at various points in the network to isolate problems, adjust active network components, e.g. amplifiers, and install or replace active or passive components, where required.

A sweep test signal extends the test measurements to multiple frequencies. A "reverse sweep" is currently used to test the return plant health at frequencies spaced across the upstream spectrum, i.e. 5 to 45 MHz in the U.S. and 5 to 65 MHz in Europe. A "forward sweep" is used to test the network at downstream frequencies, i.e. 55 to 850 MHz in the U.S. and 75 to 1000 MHz in Europe.

When performing the reverse sweep measurements, care must be taken to prevent interference between the injected test signals and the active services on the network, e.g. DOCSIS, set-top box traffic, and VoIP services. The most straightforward way to avoid interfering with active services is to sweep at different frequencies than those used by the services, which is the approach used by prior-art reverse frequency sweeps. In forward sweeps, since the frequency band is relatively wide, vacant frequency channels within the frequency band can be used; however, this method depends on there being enough unoccupied spectrum channels that the measured frequency response is useful for troubleshooting cable network problems. Unfortunately, as the relatively narrower return path becomes crowded with DOCSIS carriers, the conventional reverse sweep method becomes decreasingly useful. In the extreme case, if there are no empty frequency bands, the conventional method breaks down completely, and no frequency response can be measured without causing code word errors and packet loss in customer's traffic.

When frequency diversity is accomplished with a narrow-band transmitter and receiver, synchronization must be maintained between the transmitting equipment and the receiver throughout the course of the measurement. A tradeoff is necessary between sweep time and synchronization precision, which can be challenging when diverse hardware platforms are involved. Closed-loop synchronization further requires two-way connectivity, i.e. instrument access to both the forward and return paths.

Another consideration is that this prior-art approach requires that the transmitter be kept aware of which frequencies are used and unused. In legacy sweep test systems, this is accomplished by the user maintaining a sweep plan, which contains the channel lineup.

In the case of a reverse sweep, time diversity is a possibility because return path signals are bursty in nature, i.e. it is possible to hold off sending sweep pulses until the carriers become idle.

However, when reverse sweeping from anywhere other than the fiber node, one cannot detect upstream activity from the other legs of the network. As a result, one must either anticipate idle times by monitoring the DOCSIS MAP packets, or be informed of idle slots by some headend device, e.g. a CMTS-tied controller, and then make prompt use of the idle time. Both approaches assume that an access to the forward path is available.

Instead of transmitting a test signal, an alternative approach is to use the active signals themselves to characterize the network. A reference measurement is made at the transmitting end of the network under test, the reference measurement is sent to the receiving device, which performs its own measurement. As no transmission is required in the occupied channels, this is an interference-free measurement, again provided that the sweep plan is accurately maintained. Furthermore, if the levels of the active services' signals are varying only slowly over time, precise measurement timing synchronization is unnecessary.

In the case of reverse sweep, application of this method is less straightforward. Because the levels of the various modems in the network exhibit device-to-device transmit level variation, and each device also may exhibit burst-to-burst transmit level variation, obtaining a reliable reference measurement may require referencing bursts from a specific modem, or even specific bursts. Perhaps a greater obstacle is that at the outer edges of the network, or certainly at a specific drop, there may be no modem bursts available to reference. In this scenario, the approach breaks down and requires that one of the other two prior-art approaches to be used.

An object of the present invention is to overcome the shortcomings of the prior art by providing a non-disruptive method of measuring the frequency response of a cable network using signals of low power.

SUMMARY OF THE INVENTION

Accordingly, the present invention relates to a method for obtaining a frequency response of a cable network between first and second spaced apart points thereof, the method comprising:

(a) inserting a multi-frequency test signal into the cable network with a transmitter at the first point at a power level below that of active signals on the cable network, so as to substantially not disrupt the transmission of the active signals; and (b) coherently detecting power readings of the multi-frequency test signal with a receiver at the second point of the cable network; and c) generating the frequency response of the cable network from results of step b).

Another aspect of the present invention relates to an apparatus for obtaining a frequency response of a cable network between first and second spaced apart points thereof, the apparatus comprising:

a transmitter configured to provide a multi-frequency test signal to the cable network at the first point thereof at a power level below that of active signals on the cable network, so as to substantially not disrupt the transmission of the active signals sharing at least one frequency with the multi-frequency test signal; and a coherent receiver configured to coherently detect power readings of the multi-frequency test signal at the second point of the cable network.

BRIEF DESCRIPTION OF THE DRAWINGS

The invention will be described in greater detail with reference to the accompanying drawings which represent exemplary preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

In an embodiment of the present invention, sweep signals (forward and reverse) are transmitted at such low power, e.g. at least −30 dBc and/or below the noise floor of the CATV signal, that they are non-interfering with active services. The sweep signals may be transmitted at the same time and frequency as the active signals, but in such a way that they may be orthogonal, and mutually non-disruptive.

Because of the test signal's wideband characteristic, insertion at too strong a level relative to active services will cause severe disruption or total outage of the active services. Therefore, care must be taken to limit the level of the signals being inserted.

Figure 1A:
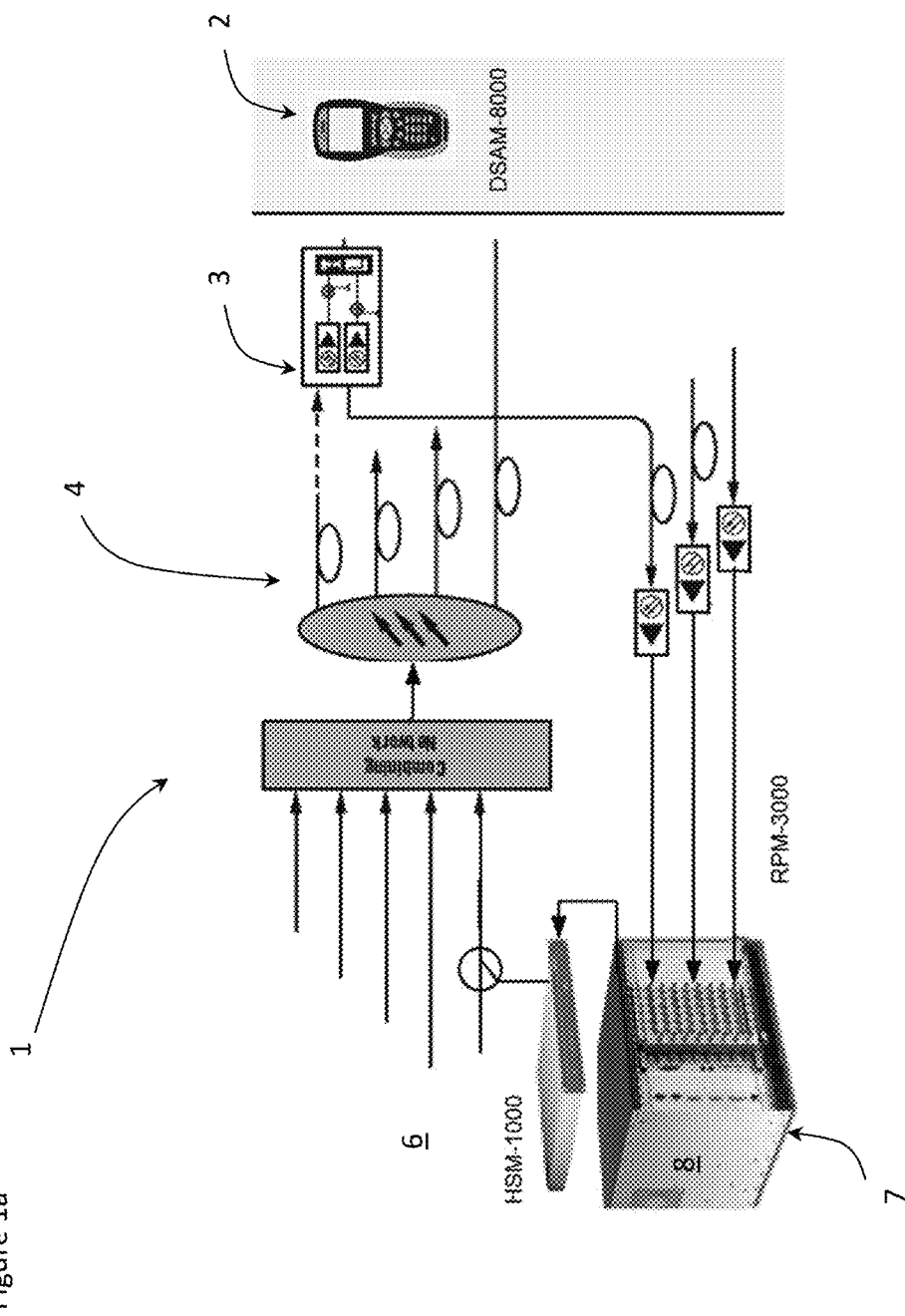
FIG. 1a illustrates a schematic diagram of a reverse sweep testing system in accordance with an embodiment the present invention.
Figure 3:
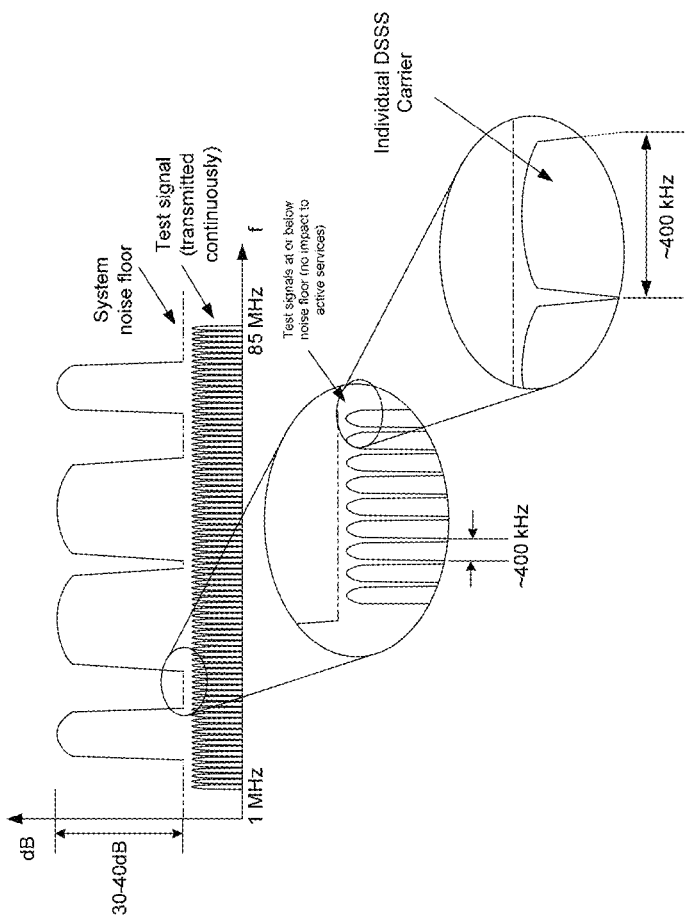
FIG. 3 illustrates a CATV spectrum including the test signal in accordance with an embodiment of the present invention.

With reference to FIG. 1a, a reverse sweep system 1, according to an embodiment of the present invention, includes a first controller 2 with suitable computer software and/or hardware configured to instruct a digital sweep transmitter, e.g. found in a DSAM-8000 handheld test device, to transmit a test signal comprising a sweep, e.g. continuous, of low power unmodulated or modulated test carriers starting at a lower limit, e.g. 5 MHz, and ending at an upper limit, e.g. 45 MHz, at intervals and bandwidths of from 100 to 400 KHz (See FIG. 3). Preferably, the test signal is transmitted at a low power, e.g. below the system noise floor or at least −30 dBc, or perhaps at least −40 dBc, below the CATV channel signals. The test signal may be repeated continuously to provide a suitable "chip" count, as hereinafter discussed. The test signals are injected at a suitable node or location 3 in a cable network 4, and propagate upstream to a suitable location, e.g. headend 6, to a sweep receiver 7, e.g. a RPM 3000 or RPM 3000 expansion slot, with a second controller 8 with suitable software and/or hardware configured to collect the power measurements of the test signals and transmit them back to the first controller 2. Typically the receiver 7, i.e. the second controller 8, handles the demodulation process, i.e. timing recovery, integration and calibration, and also the creation of the result and generation and transmission of a message to the first controller 2. Typically, the first controller 2 handles the initial setup, reception of the result message and display of the results to the user; however, the first and second controllers 1 and 2 may perform more or less of the process steps.

Unlike the prior art methods, the low-power approach enables "one-way" sweep measurements, in the sense that the sweep receiver 7 passively measures the sweep response and is not responsible for coordinating the measurement. Since time synchronization is no longer critical, the measurement results may be communicated back to the first controller 2, in the case of reverse sweep, by legacy telemetry, such as an HSM-1000, transmitting on the downstream path of the cable network 4 or any other known method, such as IP using DOCSIS, a cellular modem, WiFi, or Ethernet connection.

Figure 1B:
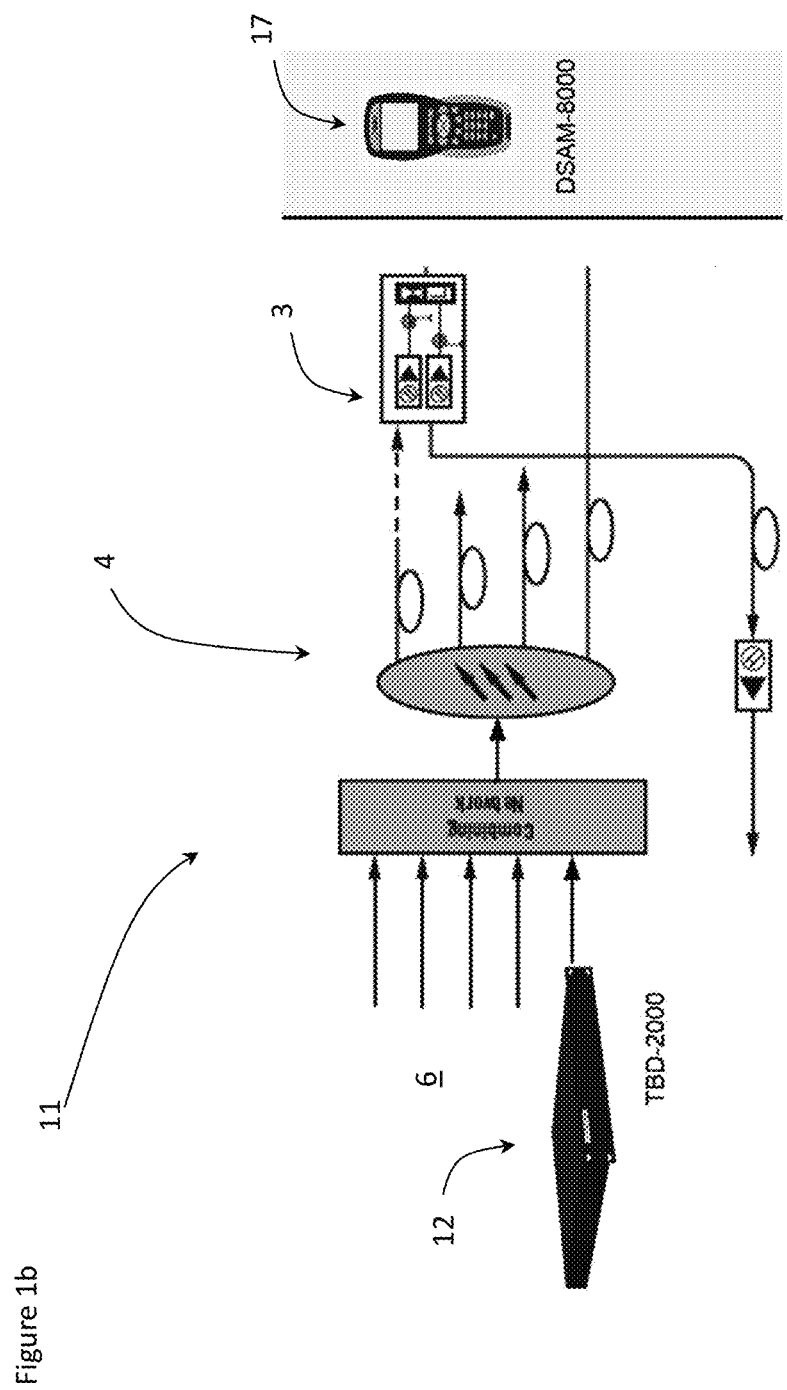
FIG. 1b illustrates a schematic diagram of a forward sweep testing system in accordance with an embodiment of the present invention.

With reference to FIG. 1b, a forward sweep system 11, according to an embodiment of the present invention, includes a first controller 12 with suitable computer software and/or hardware configured to instruct a digital sweep transmitter, e.g. found in a TDB-2000, to transmit a test signal comprising a sweep, e.g. continuous, of low power unmodulated or modulated test carriers starting at a lower limit, e.g. 54 MHz, and ending at an upper limit, e.g. 890 MHz or 1000 MHz, at intervals or bandwidths of from 100 to 400 KHz (See FIG. 3). Preferably, the test signal is transmitted at a low power, e.g. below the system noise floor or at least −40 dBc, or perhaps at least −50 dBc, below the CATV channel signals. The test signal may be repeated continuously to provide a suitable "chip" count, as hereinafter discussed. The test signals are injected at a suitable node or location in the cable network 4, e.g. headend 6, and propagate downstream to a suitable location, e.g. node 3, to a sweep receiver 17, e.g. a DSAM-8000, with a second controller with suitable hardware and software configured to receive and compile the test results.

The test signals may be implemented with unmodulated test carriers, or modulated test carriers. In a first, simpler method, unmodulated, continuous wave (CW) test signals are transmitted into the cable network 4 at the input point, e.g. the input point is in the head end 6 for forward sweep; input point is in the field, e.g. node 17, for the reverse sweep. The test signals are transmitted continuously at multiple frequencies, so as a composite they form a wideband, OFDM-like (orthogonal frequency-division multiplexing) waveform. In OFDM, a large number of closely spaced orthogonal sub-carrier signals are used to carry data on several parallel data streams or channels.

Since the measurement requirements and native signals differ considerably from the return path, the optimal waveform parameters may be different. For example, unlike bursty upstream signals, in the forward path analog and digital signals are continuously present. As seen from the upstream parameter Table 2 above, 100% duty cycle signals such as these result in very long measurement times.

Furthermore, CNR on the forward path is typically higher than the return path, as evidenced by the higher order modulations, such as 256QAM, which are deployed. Consequently, test signals need to be inserted at even lower power levels relative to the carriers; −50 dBc may be necessary to avoid objectionable degradation, for example.

In the case of the forward (downstream) path, CW test signals may be inserted and have a bandwidth of at least 50 kHz, preferably at least 100 kHz, and more preferably between 100 kHz to 500 kHz. The test signal is starts at a lower limit, of for example between 45 MHz and 55 MHz, and extends to an upper limit, of for example between 850 MHz to 1000 MHz. The bandwidth of the test carriers, e.g. at least 50× and preferably at least 100× thinner than the bandwidth of the CATV channels, ensures that at least one test carrier will fall in a guard band between active forward path CATV channels, which are generally spaced at 6 MHz to 8 MHz intervals, regardless of the active CATV channel plan in use, which provides that the test carriers between CATV channels have a higher SNR than those test carriers overlapped with active forward path services. Fortunately, since the frequency resolution needed for forward sweep is less than the reverse sweep, in an alternative embodiment the forward sweep interval may be on the order of 5 MHz to 10 MHz (compared with 200 kHz in the return path).

In an example case for the return (upstream) path, a CW signal may be inserted at least every 50 kHz, preferably at least every 100 kHz, and more preferably between 100 kHz to 500 kHz between a lower limit, of for example between 1 MHz and 5 MHz, and an upper limit, of for example between 45 MHz and 55 MHz. The bandwidth of the test carriers, e.g. at least 50× and preferably at least 100× thinner than the bandwidth of the CATV channels, ensures that at least one test carrier will fall in a guard band between active return path CATV channels, which are generally spaced at 6 MHz to 8 MHz intervals, In a particular example of an return path test, test carriers with a 300 kHz bandwidth from 0.5 to 85 MHz provide 283 carriers.

Preferably, the first or second controller 2 or 12 transmits the test signal with fixed phase offset among the test carriers to reduce peak-to-average ratio challenges. For example: if there are 283 carriers, when they all align at cos(0) they will have a peak voltage that is 20*log(283) or 49 dB above the single carrier value. This amplitude could be detrimental to the upstream path since it could cause laser clipping. To prevent laser clipping the signal would normally have to be transmitted at a lower level, and a longer spreading sequence would be needed to give more coding gain, making the whole system take a lot longer. However, by altering the phase of each carrier this peak could be reduced by 13 dB or more allowing the signal to be transmitted higher to allow a more stable response in a shorter period of time.

Figure 2:
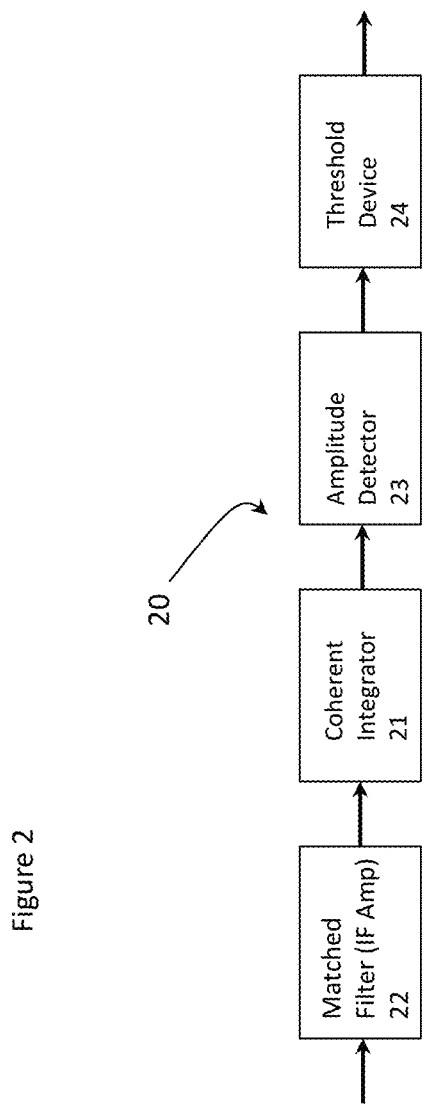
FIG. 2 illustrates a schematic diagram of a signal processor in accordance with an embodiment of the present invention.

With reference to FIG. 2, for coherent integration a signal processor 20 included with the second controller 2 or 12 includes a coherent integrator 21, inserted between a matched filter 22 and an amplitude detector 23. The signal processor 20 samples the return from each transmit pulse at a spacing equal to the range resolution of the test signal set and adds the returns from N pulses. After it accumulates the N pulse sum it performs the amplitude detection and threshold check.

Thus, for example, for a range of 75 Km and a range resolution of 150 m. the signal processor 20 would form 75,000/150 or 500 samples for each pulse. The signal processor 20 would then accumulate (add) each of the 500 samples in 500 summers. After the signal processor 20 has summed the first N pulses it would begin dropping older pulses off of the accumulator as new pulses arrive. Thus, the signal processor 20 will add the returns from the most recent N pulses.

In analog processors the integration (summation, accumulation) is accomplished by filters. The integration is accomplished by Fast Fourier Transformations (FFTs) in digital signal processors.

The noise on each pulse is zero-mean and Gaussian. The noise samples from each pulse are uncorrelated. Thus the noise out of the coherent integrator 21 has the same statistical properties of the noise out of the matched filter from the IF-amplifier 22.

The signal level at the input to the coherent integrator is assumed constant from pulse to pulse, which is indicative of a Swerling Case 0 target Swerling Case 1 target or a Swerling Case 3 target. These signal levels will be added in the integrator 21. The specific amplitude over the N pulses integrated by the coherent integrator is governed by the probability density function for the specific target type. Accordingly, the output of the coherent integrator 21 is considered as the return from a single pulse, whose Signal-to-Noise Ratio (SNR) is N times the SNR provided by the radar range equation.

Accordingly, the receivers 7 and 17 at an opposite end of the network, channelize each CW test carrier using a bandpass filter or filter bank, preferably FFT-based, but in addition to computing the power in each test carrier's sub-band the filter output is integrated coherently. The bandpass filters may be the individual frequency bins of a Fast Fourier Transform (FFT). While each individual power measurement of the filter banks' outputs from each carrier will be very much noise-like due to having been transmitted at a much lower power than the other signals in the network 4, e.g. below the noise floor or 30 dB to 40 dB below the CATV channels, when a large number of such samples are accumulated a vector will grow away from the origin. The rate of growth of the vector is proportional to (1) the level at which the signals were injected to the network 4, which is known; (2) the magnitude gain of the network 4 at that frequency, which is the desired parameter to be measured; and (3) the frequency offset between the transmitter 2/12 and the receiver 7/17. This frequency offset should be minimized by design or compensated at the time of measurement in order to separate its effects from the channel response.

Unmodulated tones can be used together with a conventional spectrum analyzer, using zero span and a very narrow RBW and with averaging enabled, to measure a sweep point.

Use of modulated test carriers enables communicating low bit rate ancillary data to the receiving device 7/17, such as IP Address and/or routing/GW information, Tx level information (injection level), calibration data, GPS coordinates, HW revision, SW revision, Instrument serial number, licensing key, authentication information (password), or Tech ID.

Figure 4:
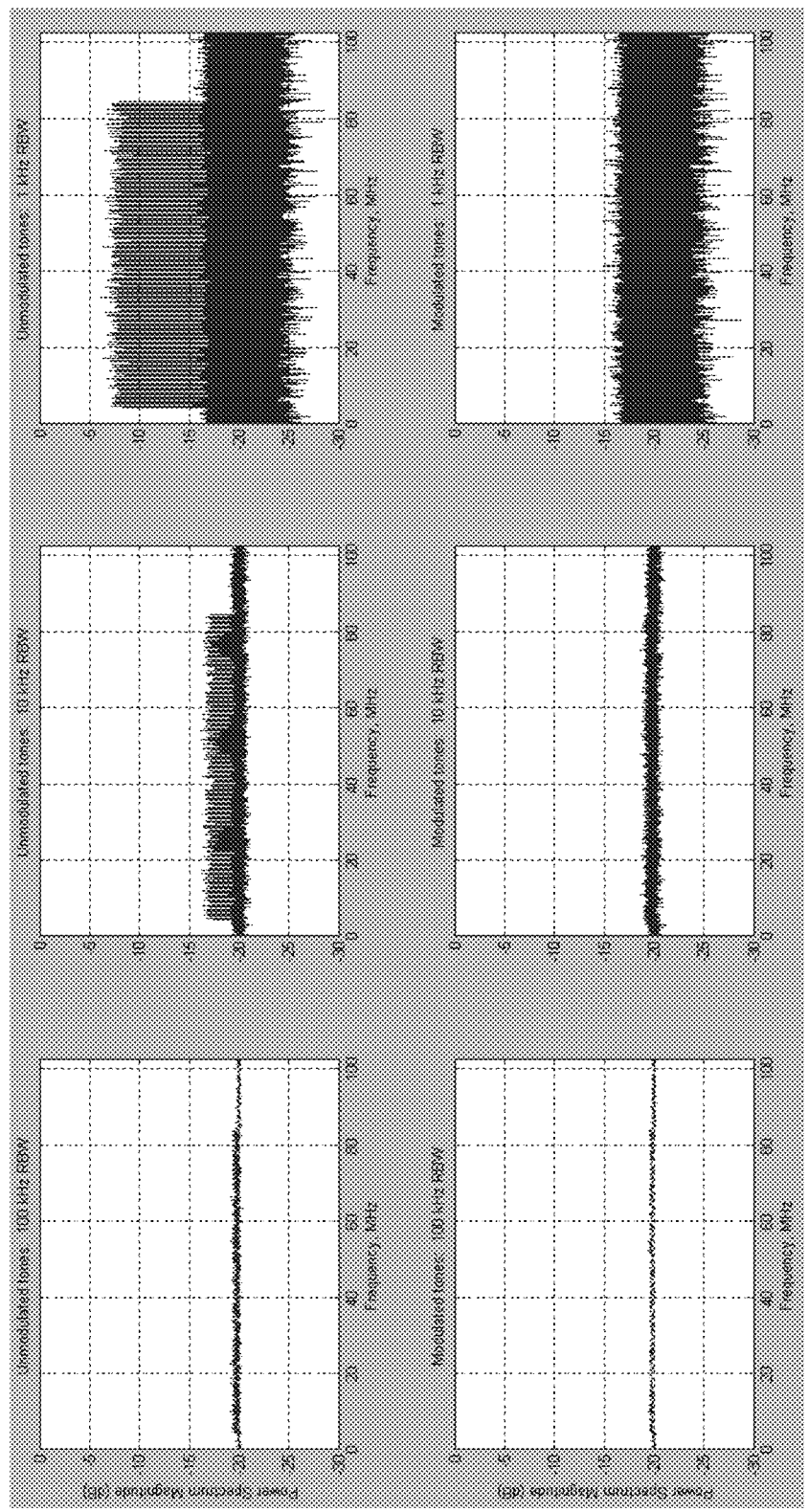
FIG. 4 illustrates plots of frequency vs power for modulated and unmodulated test signals at various resolution bandwidths.

One advantage of using spreading codes, as opposed to unmodulated tones, is that the sweep waveform is not readily detectable with spectrum analysis. As evidenced by FIG. 4, in which the top series of plots disclose unmodulated tones at −10 dB SNR as measured with a RMS-averaging spectrum analyzer with a resolution bandwidth (RBW) of approximately 100 kHz, 10 kHz, and 1 kHz (left to right). The bottom series of plots shows the same measurements with modulated carriers. In both cases, there are 201 carriers spaced 400 kHz apart, between 5 and 85 MHz.

Modulation provides immunity to narrowband interference, relative to using unmodulated carriers, and enables performing measurements simultaneously without coordination. When modulation is applied to the test carriers, the receiver 7/17 requires sophisticated algorithms to demodulate the test signals, as they are typically received at negative SNRs.

While recovering signals at negative SNR is not intuitive, it is possible using Direct Sequence Spread Spectrum (DSSS) modulation. DSSS works by duplicating each transmitted symbol hundreds, or even thousands of times. While each individual symbol copy, i.e. each chip, is impossible to decode on its own, by examining the cumulative result of the many chips a correct decision can be made.

Along with decoding the chips, the DSSS receiver, e.g. receiver 7 or 17, also measures their received signal power levels. If the transmit power level is known, the received power level is a measurement of the channel gain or loss.

By sending not just one DSSS signal, but several such signals at various frequencies, one can estimate the frequency response of the entire measurement bandwidth by simply plotting each of their channel gains in a graph. This type of waveforms can be described by the number of carriers and the code length, i.e. the number of times each symbol is coded and repeated (modulated) within each carrier or the number of chips per symbol. This is generally a very long number that the spread spectrum receiver correlates to, as is known by those who are practiced in the art.

Normally, MC DS-CDMA has multiple carriers and a code length greater than one, and the waveform is a hybrid of OFDM and CDMA. When either the number of carriers or code length is one, one gets familiar modulation types of CDMA or OFDM. For example, when the number of carriers is one, MC DS-CDMA reduces to ordinary CMDA, such as is used for some cellular networks or digital cordless phones. When there are multiple carriers but the code length is one, MC DS-CDMA reduces to ordinary OFDM as is used for 802.11b/g/n and DVB-T.

Figure 5:
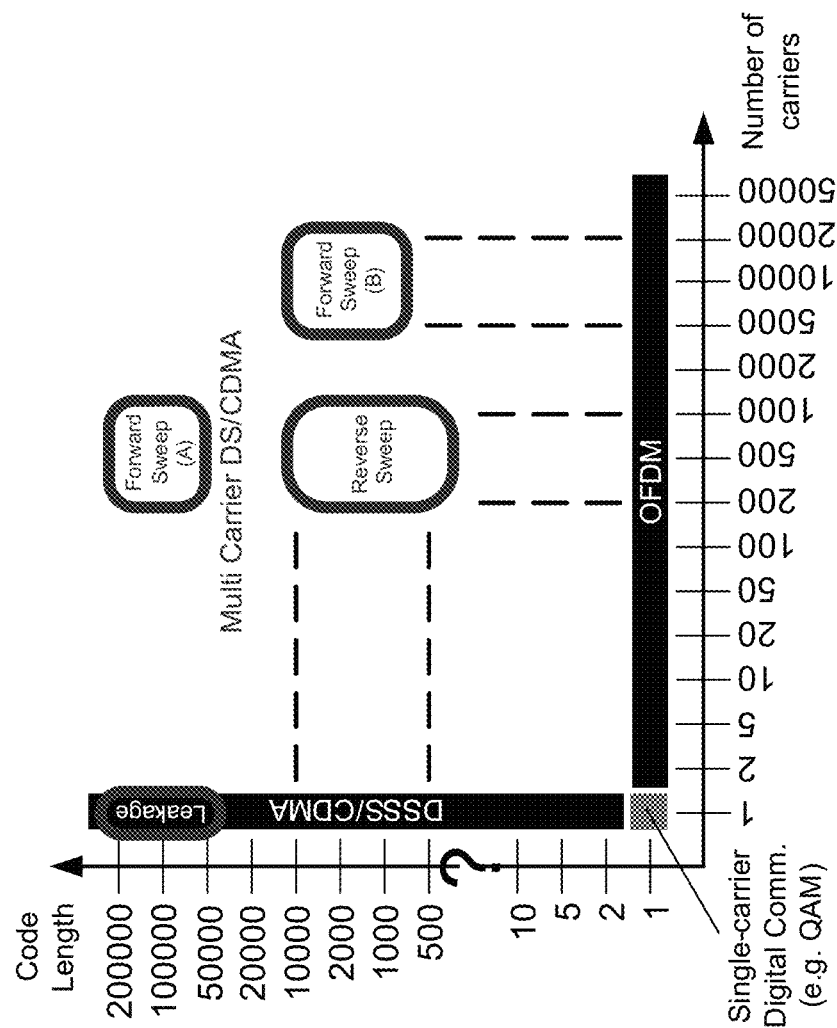
FIG. 5 illustrates a plot of code length vs number of carriers for the test signal of an embodiment of the present invention.

With reference to FIG. 5, for measuring sweep responses, it is desired to have many carriers, since each carrier corresponds to a single sweep point. The specific number of carriers needed is a straightforward function of the necessary frequency resolution and sweep frequency range. Typically, a range of interest for forward and reverse sweeps is greater than 100 carriers, preferably greater than 200 carriers, and more preferably between 200 to 1000 carriers. In another embodiment, the carrier counts for forward sweeps may be greater than 5,000 carriers, and preferably between 5,000 and 20,000 carriers. The choice of code length impacts many measurement performance metrics including sync acquisition time, measurement time, minimum SNR, insertion level, and error correction needed for recovering data sent via the waveform.

Figure 6:
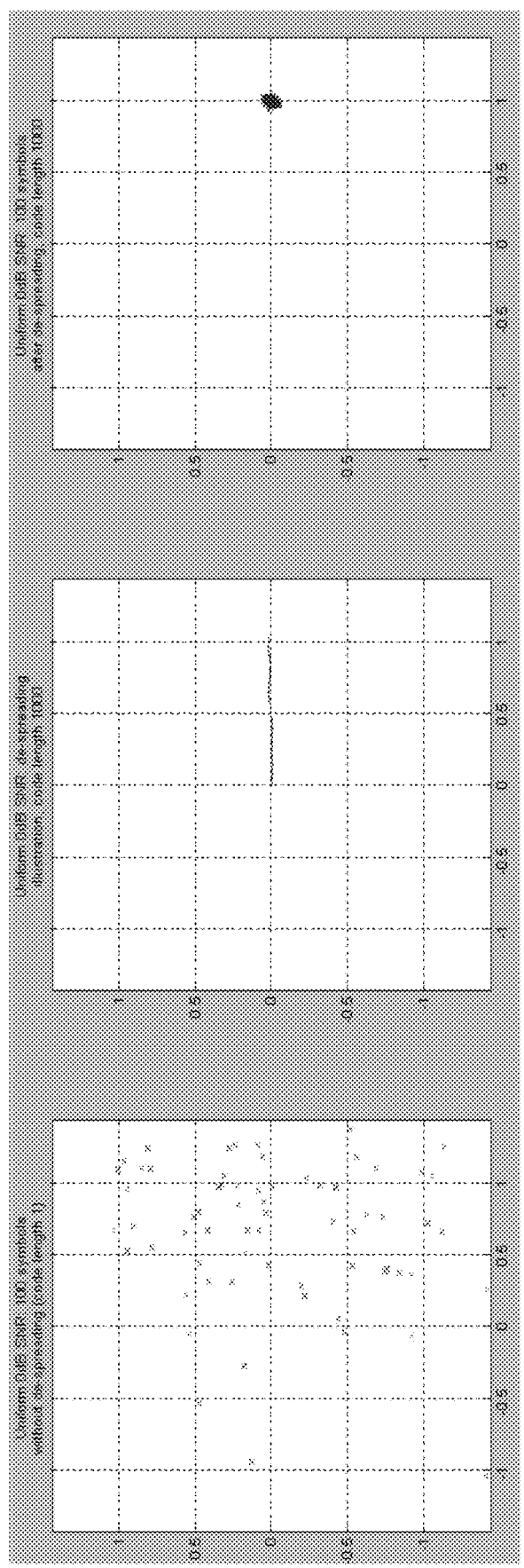
FIG. 6 are plots illustrating the chip accumulation, or despreading, process.

The code length ranges of interest for forward and reverse sweeps may be greater than 500 chips per symbol, greater than 1,000 chips per symbol, and more preferably between 500 and 10,000 chips per symbol (see FIG. 5). Alternatively, for the forward sweep implementations the code length ranges may be greater than 50,000 chips per symbol or preferably between 50,000 and 200,000 chips per symbol (FIG. 5 Forward Sweep A). In another embodiment of the forward sweep system (FIG. 5 Forward Sweep B), 1,000 to 10,000 chips per symbol may be used. Decoding the waveform can most readily be understood in the complex baseband domain, as shown in FIG. 6. Consider despreading as an accumulation of many chips in the complex baseband before a symbol decision, and a channel gain estimation in sweep, is performed. Each individual chips is comprised of signal and noise; the leftmost subplot shows 100 such chips at 0 dB SNR.

The noise component is zero-mean, and when accumulated does not increase linearly in power. Meanwhile, the symbol component is unit mean, and so its power does accumulate linearly across the despreading interval. The middle subplot of FIG. 6 shows an example result when 1000 chips of 0 dB SNR are accumulated and normalized by the first controller 2 or the second controller 17. Although the trajectory is not perfect, and the result is not exactly equal to the expected output of 1+j0, it is less noisy than the individual chips prior to integration.

The rightmost subplot shows the endpoints of 100 such integration and normalization operations. As can be seen, the effective SNR is greatly improved. In fact, the SNR increases according to the formula 10*log(L), where L is the number of chips integrated, i.e. the code length.

FIG. 6 is also helpful for understanding the effect of clock offsets between the transmitter and receiver on the despreading process. Small static frequency offsets result in a rotation of the "signal" portion of the received noisy chip, and the accumulation becomes somewhat curved, and the endpoint magnitude is reduced.

The effect of frequency offset is negligible if the error over the course of L chips amounts to less than about 20°, an uncompensated clock drift of 0.26 ppm per codeword, or 40 ppm/sec with representative reverse path parameters, or 0.004 ppm per codeword (0.61 ppm/sec) in an example of forward sweep.

On the basis of this calculation, it may be possible to demodulate the sweep waveforms without chip-wise clock offset estimation. However, the sweep receiver 7 or 17 may need to estimate this clock offset at the codeword rate in order to perform adequately at high frequencies.

Another challenge of receiving a very low-power multicarrier waveform is achieving synchronization at negative SNR, a critical step toward achieving despreading gain. In the most general case, four loops must be synchronized for each carrier: carrier frequency offset, chip clock rate offset, chip timing offset, and code synchronization. In the case of a direct-to-digital transmitter 2 and a direct-sampling receiver 7, as are preferred for reverse sweep, carrier offset and chip clock rate offset compensation are accomplished in a single clock acquisition step. Clock offset compensation must be performed whether modulated or unmodulated carriers are used, while chip timing and code sync are challenges unique to a system which uses modulated carriers.

Figure 7:
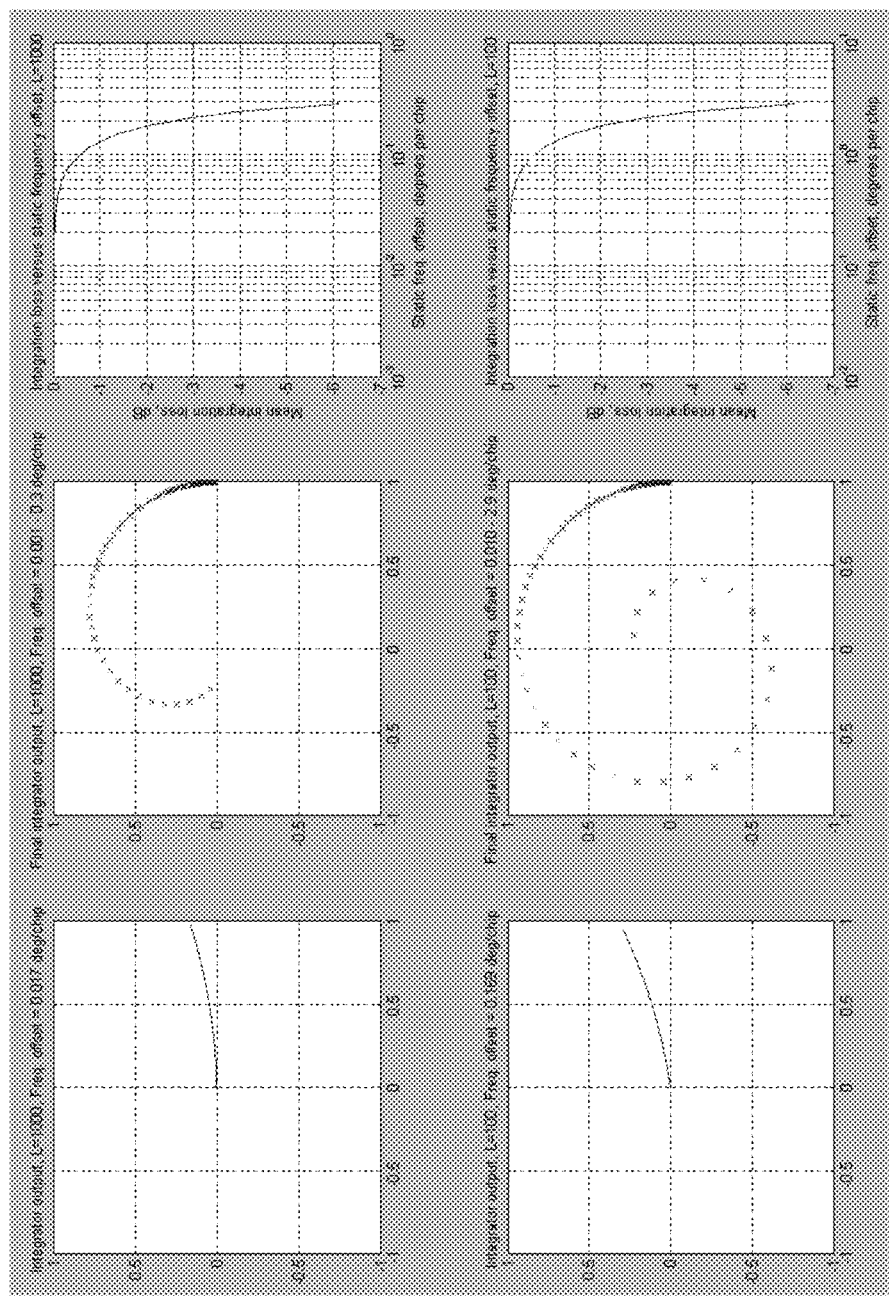
FIG. 7 is a graphical illustration of the effect of frequency offset on the dispreading process.

To the extent that chip and code sync must be jointly estimated with frequency and chip clock, use of modulated carriers further complicates the acquisition process. In the case of reverse sweep, and assuming a direct-to and direct-from-digital system, clock acquisition may be performed mainly using the low frequency carriers, which are less sensitive to clock offset error. Graphical illustration of the effect of frequency offset on the despreading operation are illustrated in FIG. 7, with L=1000 (top plots) and L=100 (bottom plots). The nominal accumulator output becomes curved (left) and as a result, the endpoints' magnitudes are diminished (middle). When the offset is less than about 20° over the period of L chips, the effect on the output magnitude is negligible (right).

With all other parameters equal, a 3 dB impact to the code sync metric can be expected when clock error amounts to 0.2° per chip, which corresponds to a ±10 ppm at 8.5 MHz, again assuming illustrative reverse sweep parameters. Therefore, code sync can be achieved without simultaneously trying a large number of clock offsets.

As for maximizing the likelihood of code sync, there are tradeoffs to be considered in designing the waveform among code length, mean- and worst-case code lock time, and computational resources required.

Figure 8:
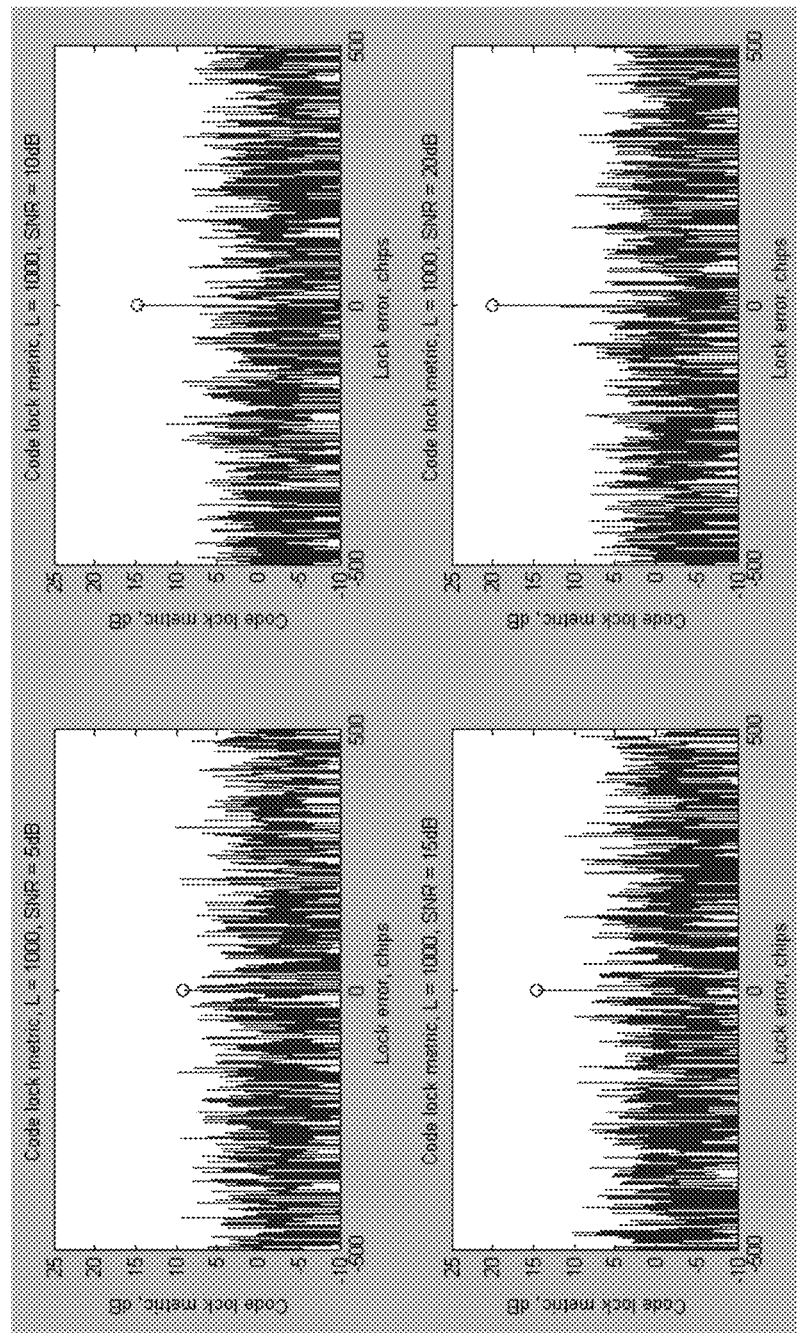
FIG. 8 illustrates code lock metrics for various signal to noise ratios.

When the post-despreading SNR is higher, the probability of detecting the correct code sync is increased, as shown in FIG. 8. Since longer codes provide for greater despreading gain, the code sync error detection metric is improved by using longer codes. At the same time, however, the number of incorrect code syncs—the uncertainty region—increases linearly with code length. For the illustrated example, with L=100 there are 1 correct and 99 incorrect code syncs; with L=1000 there are 999 incorrect code syncs. Code lock metric with code length L=1000 at various post-despreading SNR. Note that the coding gain with L=1000 is 30 dB. As shown in the upper left corner, when the post-despreading SNR is +5 dB (pre-despreading SNR=−25 dB) there is a very high chance of an erroneous sync peak exceeding the correct timing. On the other hand, when the post-despreading SNR is +20 dB (lower right plot) there is a very low likelihood of timing sync error.

The hardware requirements to search the entire uncertainty region simultaneously increase with code length as well. Assuming the processing hardware available is inadequate for searching all codes at once, a sequential search must be used, which will take longer to search for larger codeword length L.

Figure 9:
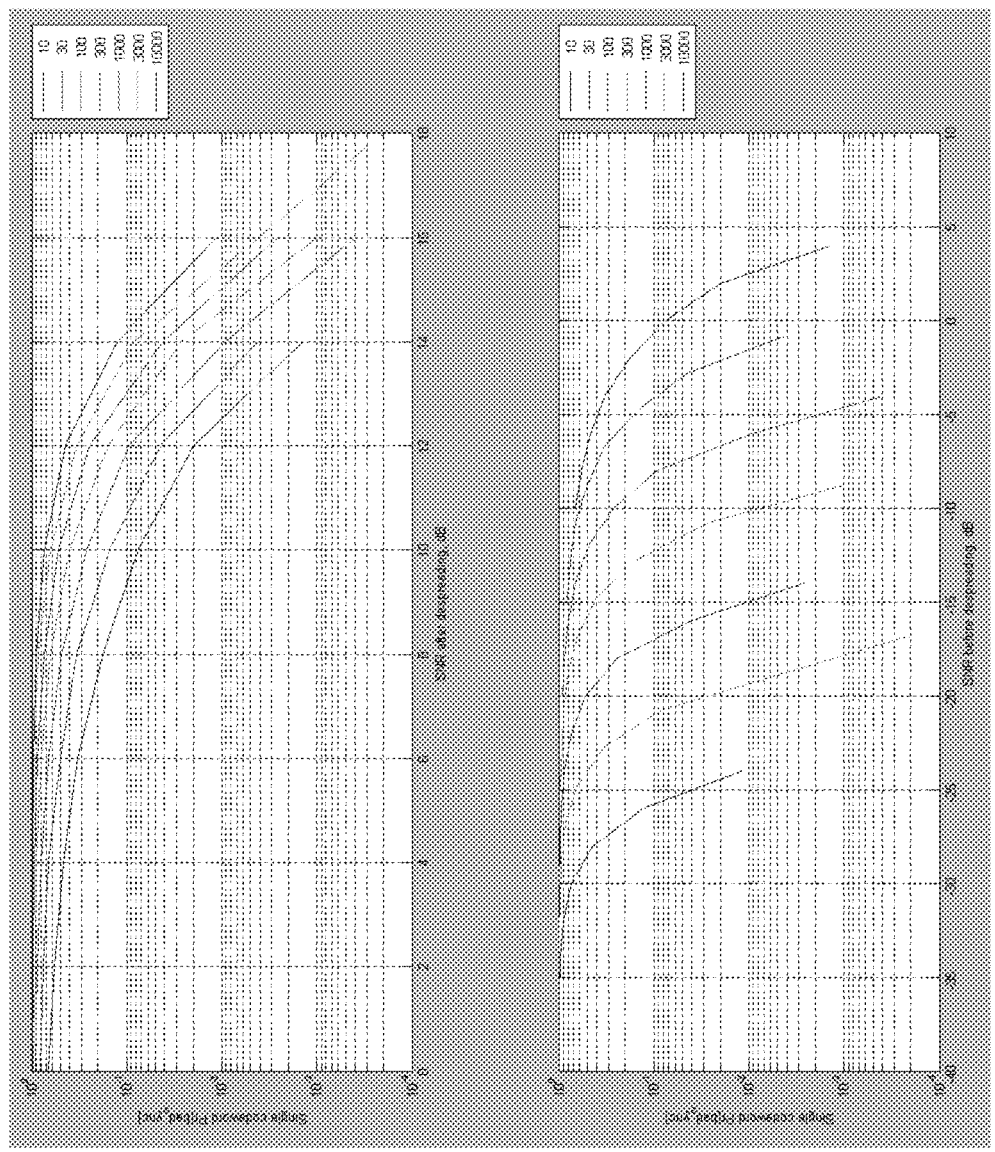
FIG. 9 illustrates a plot of the probability of a correct sync detection vs post dispreading SNR for various code lengths (L)

With reference to FIG. 9, the increase in despreading gain from using longer codes more than overcomes the increased length of the uncertainty region. The mean time to sync, and worst-case time to lock are related to the probability of false lock in a non-trivial way. For high sync probability scenarios, e.g. 90%+ likelihood of correct sync, delving into the statistics of mean time to lock are not merited. Instead, it suffices to say that failing to sync after analyzing 3-5 codewords is very unlikely.

In order to increase the probability of correct detection across multiple codewords, metrics such as ">M of N codewords" are commonly adopted. For example, if one requires the same sync detection in 2 of 3 codewords, again assuming L=100 and the probability of erred timing result is 99%, a "2+ of 3" algorithm reduces the probability of missed positive from 1% to 0.03%, while reducing the probability of a false positive from 1% to <0.01%.

Although the number of incorrect code sync states increases linearly with code length, the despreading gain increases as well. As a result, the minimum SNR required to ensure (with some confidence) correct sync detection is relaxed as the code length increases. For example, with code length L=1000 at SNR=−15 dB, there is a 99% probability of correct sync detection. In the same condition with L=300, the odds of correct sync detection are only 42%.

An Example of the Reverse Sweep Application.

MC DS-CDMA is a highly configurable family of waveforms. For sweep applications, the number of carriers needed is based on the frequency resolution requirement, since one gets only one sweep point for each carrier. For example, if 400 kHz frequency resolution is required across the frequency range 5 to 8 MHz, this dictates that one should have at least (85-5)/0.4=200 carriers inside this bandwidth. To meet this requirement, assuming the signals are being generated by a 204.8 MSPS DAC, an FFT length of 256 may be used. For example, one can generate 256 "virtual carriers" between DC and 102.4 MHz, suppressing those at DC and above 85 MHz.

Adding more carriers has its drawbacks. Using more carriers results in slower measurement times and greater sensitivity to frequency and sample clock offset estimation errors. The relationships between carrier count and several key performance metrics are illustrated Table 1.

TABLE 1

Tradeoffs among Carrier Count, Code Length, and key sweep performance metrics.

| Performance Metric | Fewer carriers | More carriers | Shorter codes | Longer codes |
|---|---|---|---|---|
| Frequency resolution | Lower resolution | Higher resolution | — | — |
| Measurement time | Faster update | Slower update | — | — |
| Frequency offset sensitivity | Less sensitive | More sensitive | — | — |
| Clock offset | Less sensitive | More sensitive | — | — |
| Error rate of data sent | — | — | More bit errors | Fewer bit errors |
| Rate of data sent | — | — | Higher data rate | Lower data rate |
| Synchronization time | — | — | Faster sync | Slower sync |

There are tradeoffs involved with the code length parameter, as well. Shorter codes are easier to synchronize between the transmitter 2/12 and the receiver 7/17. In other words, less time is needed before the first measurement result can be calculated. Shorter codes also allow for greater amounts of data to be transmitted in a clear channel, but less data is available when the channel is corrupted with noise.

Table 2 contains a few representative parameters and resulting measurement performance, which might be appropriate for the reverse sweep application.

The first row in the table denotes frequency resolution. In the second row, the code length is specified. The amount of despreading gain is 10*log(L) dB, where L=B/R is the length of the spreading code, B is the occupied bandwidth, and R is the codeword rate. Since L=1000 in this example, the gain is 30 dB. It is this large code gain, or despreading gain, that enables transmission of the test waveform despite it being at a much lower power than the active services' signals.

In the third row, an insertion level of −40 dBc is proposed. Assuming the return path carrier enjoys 30 dB SNR without the test signal, the SNR with the test signal present will be $-10*\log(10^{-40/10}+10^{-30/10})=-29.6$ dB during sweep, a negligible degradation.

TABLE 2

| Waveform parameter | Design/operating parameter | Derived parameter(s) |
|---|---|---|
| Frequency resolution | 400 kHz | NFFT = 256 (204.8 MSPS)<br>Chip duration = 2.5 µsec |
| Code length | 1000 symbols | Code duration = 2.5 msec<br>Despreading gain = 30 dB |
| Insertion level | −40 dBc[1] | SNR during sweep = 29.6 dB |
| Noise floor | −30 dBc[2] | |
| Frequency redundancy to aide acquisition | None | Max data rate:<br>44.4 kbps @ 45 MHz plant<br>64.4 kbps @ 65 MHz plant<br>84.0 kbps @ 85 MHz plant |
| Frequency offset sensitivity | N/A<br>(Direct Digital Tx/Rx) | — |
| Clock offset sensitivity | Sync freq: 8.5 MHz<br>85 MHz | −3.0 dB @ ±10 ppm<br>−3.0 dB @ ±1.0 ppm |
| Data channel performance | Utilization: 100%<br>99%<br>95%<br>90%<br>80% | SNR = −10 dB     BER = 3E−1<br>SNR = +0.4 dB    BER = 7E−2<br>SNR = +7.1 dB    BER = 7E−3<br>SNR = +10.0 dB  BER = 4E−6<br>SNR = +13.0 dB  BER = 1E−10 |
| Measurement time | 90% confidence<br>@ ±1.0 dB | 100% utilization[3] = 15 sec<br>99% utilization = 1.2 sec<br>95% utilization = 250 msec<br>90% utilization = 120 msec<br>80% utilization = 65 msec |

Frequency redundancy across carriers can aid with code acquisition, at the expense of data throughput. None is assumed here; where all carriers made redundant the throughput would decrease to 0.4 kbps from 44.4, in a 45 MHz plant. When more return path bandwidth is available for testing, more data can be transmitted using the test waveform; in an 85 MHz plant up to 84.0 kHz of gross data throughput is possible.

Figure 10:
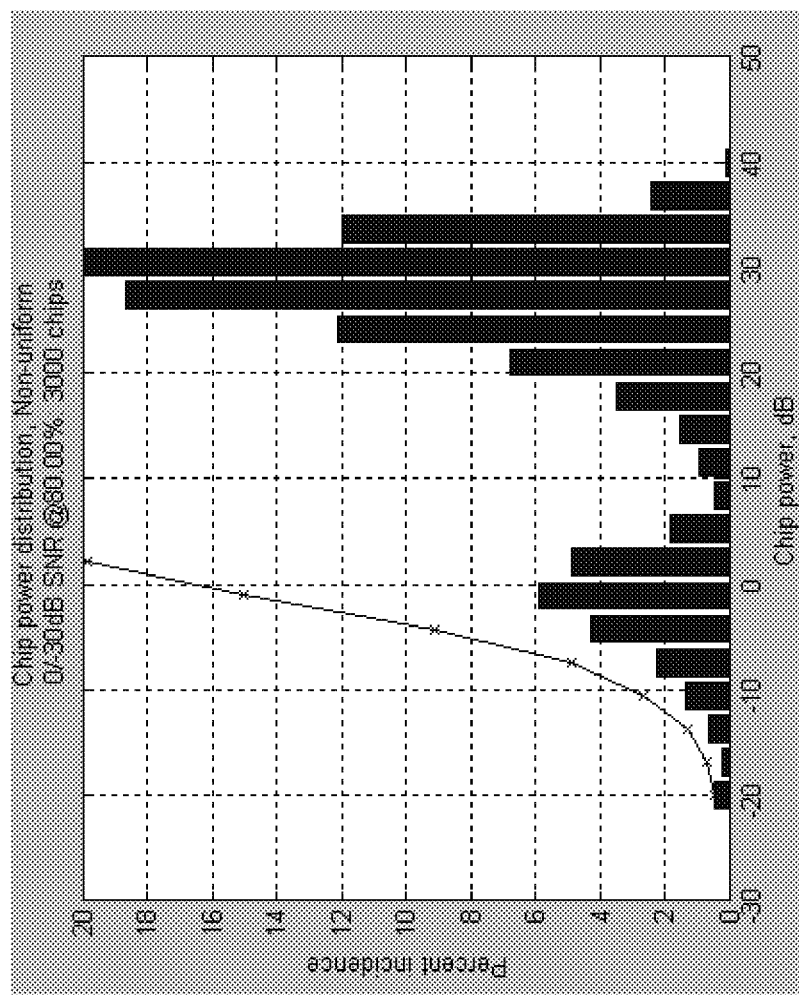
FIG. 10 illustrates a plot of chip power vs incidence percentage for the upstream path.

As discussed, sensitivity to clock offset is a function of the frequency or frequencies used for code sync detection. Using the representative waveform parameters, ±10 ppm clock offset corresponds to 3 dB of code sync With reference to FIG. 10, when the noise is non-uniform, as in the case of the DOCSIS upstream, some chips are much more severely corrupted with noise than others. In the plot of FIG. 10, the chip power distribution is shown when 80% are corrupted by +30 dB noise, and the remainder +0 dB noise.

The post-despreading SNR can also be calculated based on these same assumptions, but the calculation requires some explanation. First, one observes that, at frequencies occupied by the active services, the test signal SNR will be either of two values: −40 dB when the service is active, and −10 dB when the service is inactive. If bursts are present some portion P of the time, and assuming the receiver can detect whether the bursts are present or not, the receiver can weight high SNR chips (i.e. those at −10 dB SNR) more greatly at the input of the integrator, and can discount low SNR chips. Weighting algorithms are further discussed shortly; here total resulting SNR of the de-spread signal is determined. Assume, as in table 2, the despreading gain is 30 dB.

When P=1, the output SNR is −40+30=−10 dB. And with P=0 the output SNR is −10+30=+20 dB. It can be shown that for intermediate values of P, the output SNR will be no greater than $10*\log(P*10^{-10/10}+(1-P)*10^{+20/10})$, which is nearly equal to $10*\log((1-P)*10^{+20/10})$. As shown in the table, the post-despreading SNR from a single codeword is >7.0 dB provided the channel is less than or equal to 95% utilized, providing for a BER of 7E-3.

Weighting

Again, when the SNR varies across chips, as would be expected at frequencies where DOCSIS carriers are present, it helps the despreading greatly to discount those chips with the greatest energy prior to accumulation. Accordingly, the second controller 7 and 17 filters or removes the power reading measurements from carriers within CATV channels that are more than 95% utilized, preferably more than 90% utilized, and more preferably more than 80% utilized before the integration step is performed. The upper three plots of FIG. 11 show the despreading process without weighting, and the lower three plots show the same process when high-energy chips are eliminated prior to the integration.

Measurement Time

Figure 11:
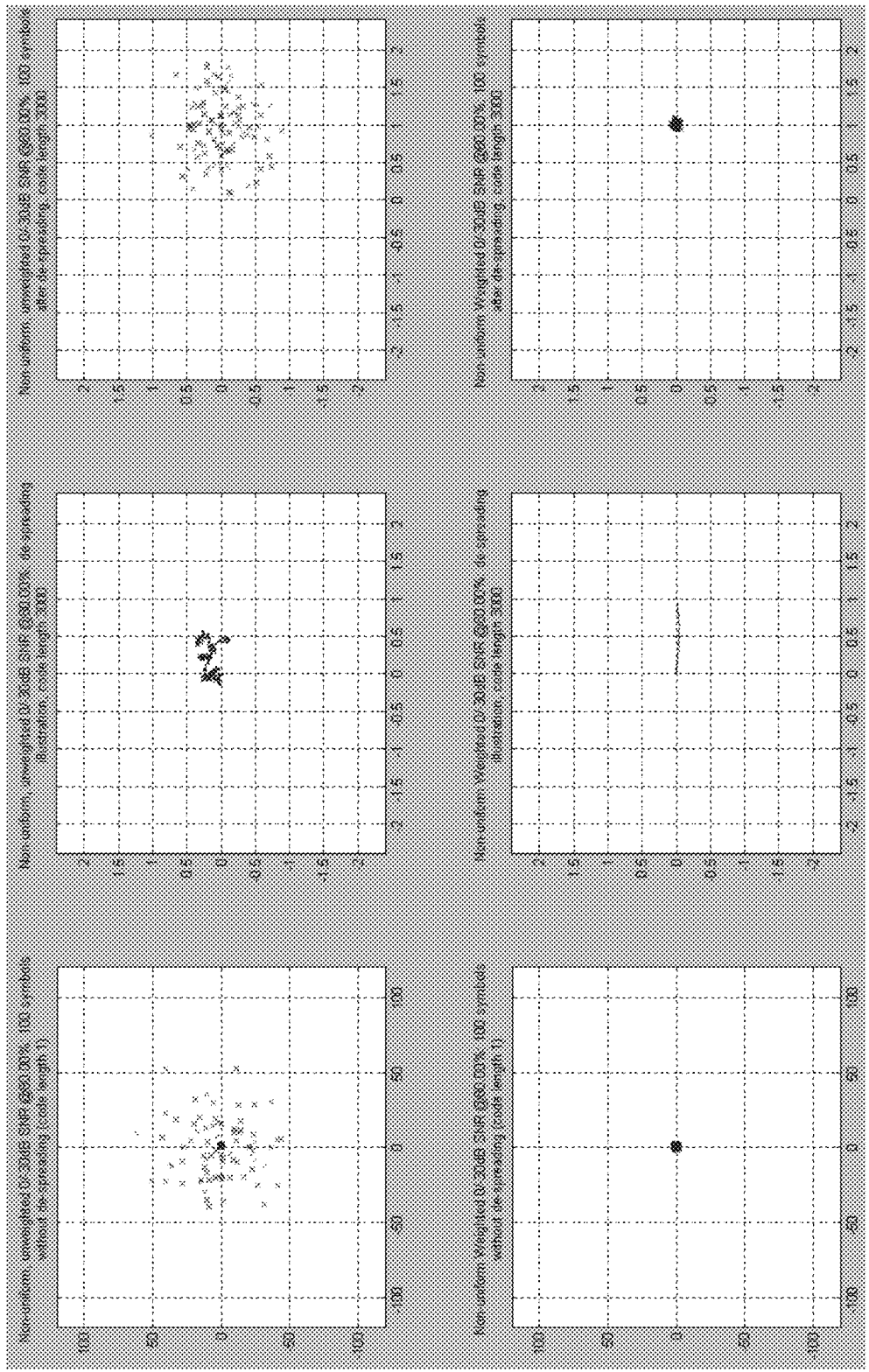
FIG. 11 illustrates despreading integration process without (top plots) and with (bottom plots) chip-wise weighting in a bi-modal noise scenario, such as would occur at frequencies occupied by DOCSIS carriers.

The final row in FIG. 11 shows minimum integration times required to achieve ±1 dB sweep response accuracy with 90% confidence. Though the values shown were experimentally determined, the theoretical basis for these values is well understood to be the non-central chi-square distribution.

Figure 12:
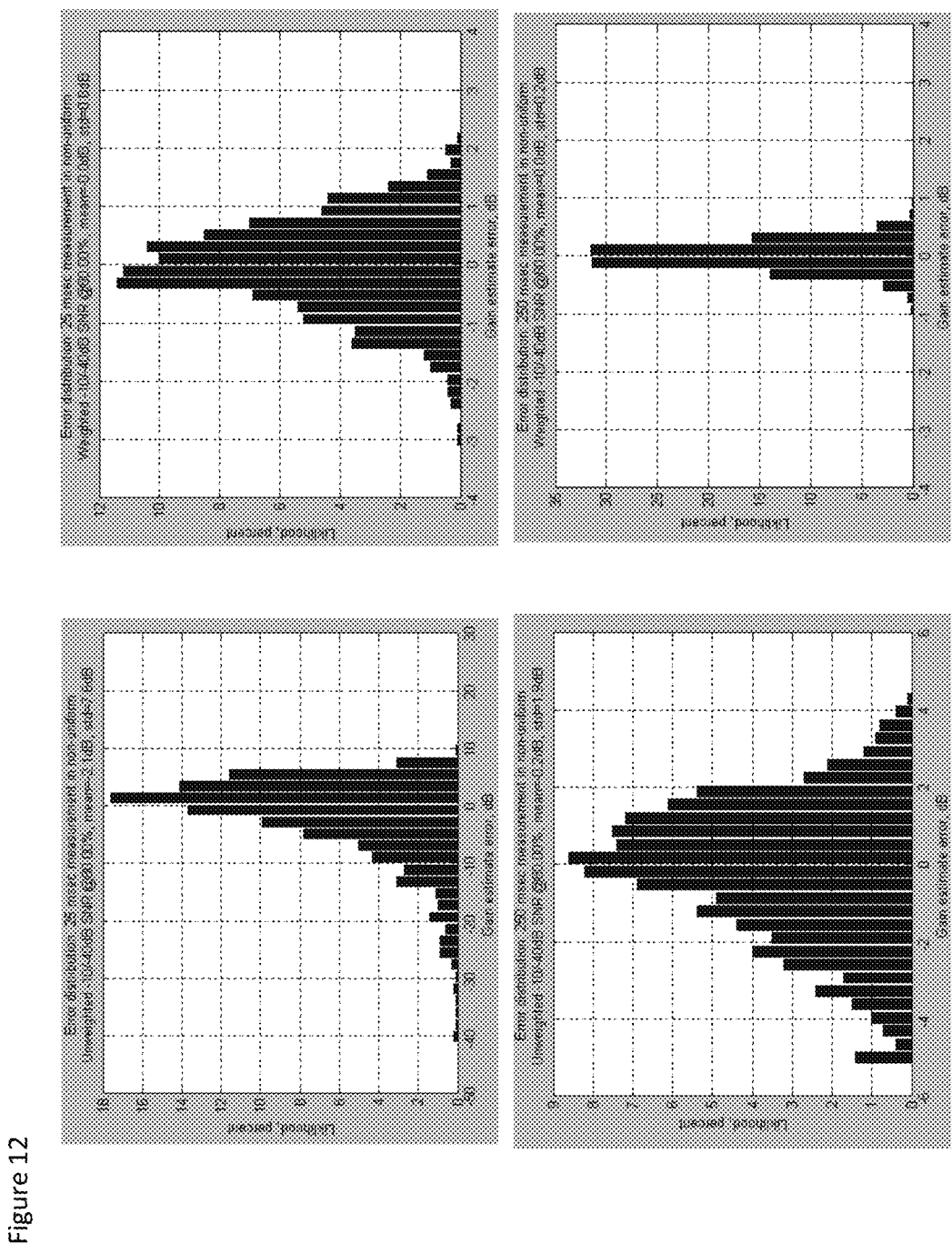
FIG. 12 illustrates the effects of weighting on confidence and speed.
Figure 13:
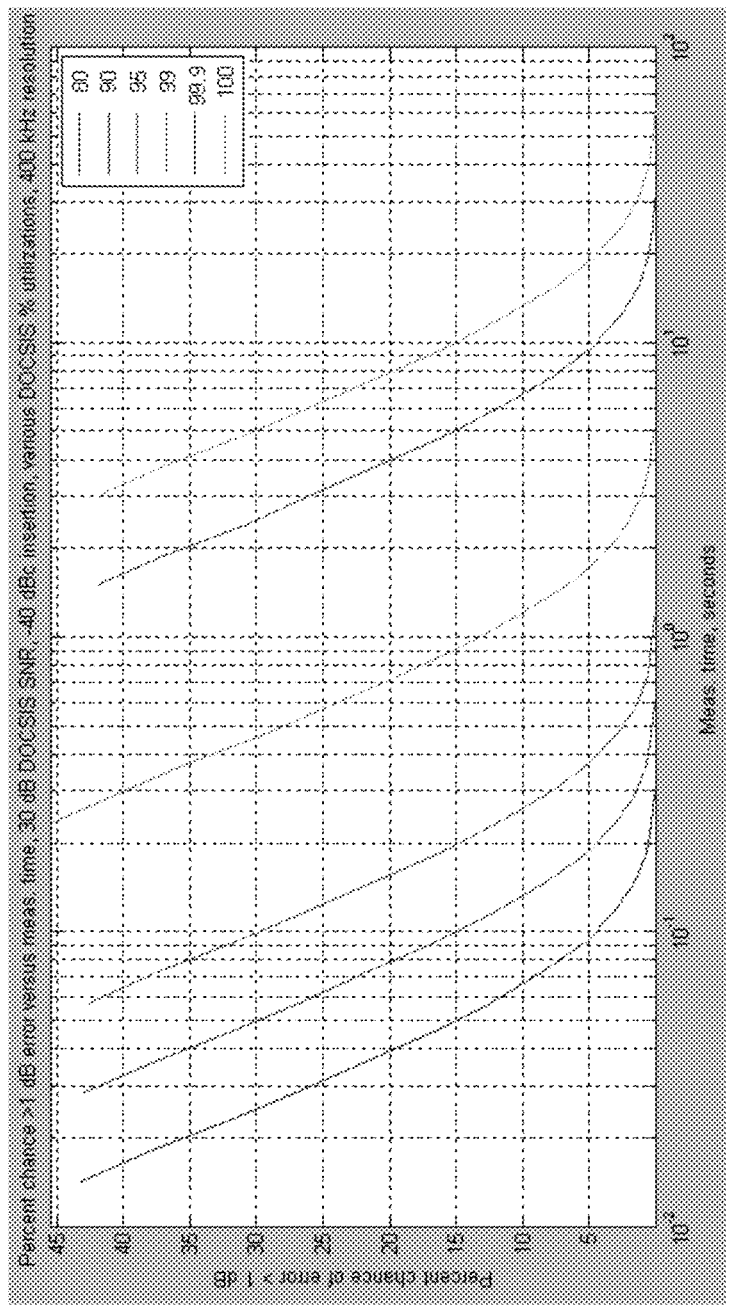
FIG. 13 illustrates the likelihood of error greater than 1 dB for various measurement times and carrier utilizations.

FIG. 12 shows how weighting improves the sweep estimation accuracy for a given measurement time, again in a bi-modal noise scenario, and how measurement time improves the accuracy with or without weighting. Use of weighting when noise is non-uniform (lower plots) and longer measurement times (right plots) reduces the likelihood of inaccurate measurements. When weighting is employed, the test sweep can achieve ±1.6 dB accuracy @95% confidence in 25 msec, or ±0.4 dB accuracy @95% confidence in 250 msec. This conclusion assumes negligible symbol timing error and operation in a DOCSIS channel with 80% utilization, 30 dB CNR, and insertion at −40 dBc FIG. 13 shows the reverse sweep measurement time performance in greater detail. Each curve in the plot represents a percent DOCSIS carrier utilization, from left to right these are 80%, 90%, 95%, 99%, 99.9%, and 100%. The measurement time required to achieve ±1 dB accuracy with a particular confidence level can be found by moving across from the desired error likelihood (e.g. 5% chance of error, or 95% confidence) until a percent utilization curve is intersected. As utilization decreases from 100%, the necessary measurement times are reduced dramatically.

For example, if our performance criterion is 95% confidence of ±1 dB, one can see that for a 95% utilized DOCSIS carrier the measurement integration time required is approximately 250 msec. If the carrier utilization is increased to 99%, the necessary measurement time increases to 1.2 seconds.

Experimental Verification

An experiment was conducted to test the feasibility of using low power waveforms to measure the sweep response. An arbitrary waveform generator was used to produce a spread-spectrum test signal that occupied 15 MHz to 65 MHz. The nominal carrier bandwidth was 400 kHz, but only every third carrier was transmitted, resulting in a sweep point spacing of 1.2 MHz. The decision to transmit only every third carrier was made to simplify the demodulation process. Because not all carriers were transmitted, the test waveform was discernable using spectrum analysis. This test signal was transmitted directly into the upstream at approximately −40 dBc relative to the DOCSIS carrier.

No data were communicated with the waveform, instead, the PN sequence was repeated over and over without modulation. In addition, the same PN sequence was used on all of the carriers. The sequence was offset by one chip per carrier to reduce the waveform's peak-to-average power.

At a hub site, the node on which the sweep waveform was transmitted was tapped and recorded with the RF recording system. Several recordings were made, with various RF front end configurations, to help ensure a good recording would be made.

The upstream was characterized by moderate loading on two DOCSIS carriers. The first was about 40% loaded, 6.4 MHz in bandwidth, at about 32 MHz center frequency. The second was about 20% loaded, 3.2 MHz in bandwidth, at about 38 MHz center frequency.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Figure 14:
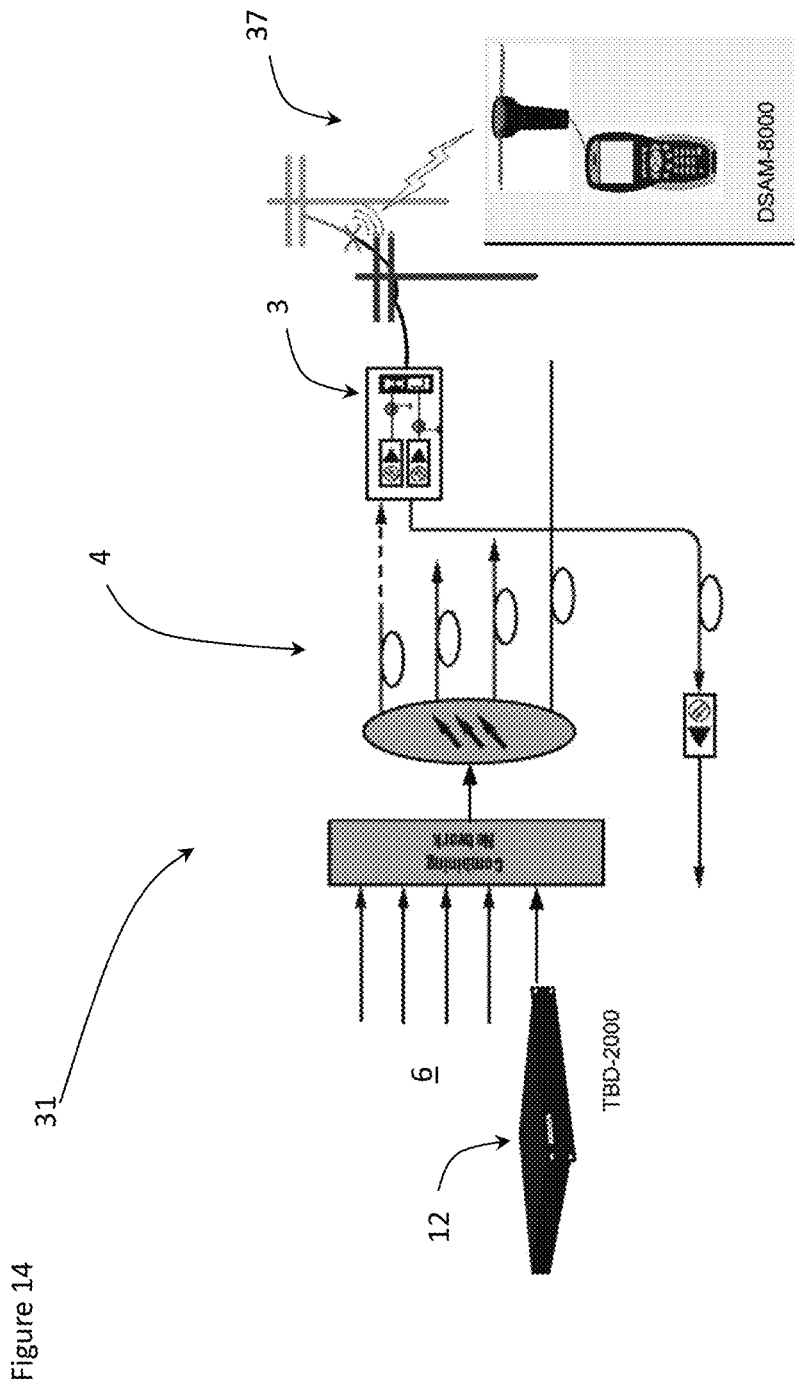
FIG. 14 illustrates a schematic diagram of a leakage detection system.

With reference to FIG. 14, the forward (or downstream) set up 11, using the same non-interfering digital sweep transmitter 12 at a first node, e.g. headend 6, of FIG. 2, can also be used in a leakage detection system 31 in an all-digital cable network 4. A receiver 37, e.g. a handheld DSAM 8000 or other portable testing device with receiver capabilities, may be used to detect the aforementioned test signal comprising a sweep, e.g. continuous, of low power unmodulated or modulated test carriers leaking from the network 4 at locations external to the network 4. A cut or fault in the network 4 is considered the second or downstream node. This arrangement does not require a pilot frequency or preservation of an analog channel for leakage testing. Moreover, the wideband leakage waveform enables UHF leakage detection with directional UHF antennas.

A modulated test signal provides a mechanism to broadcast low bit rate ancillary data to the field, such as Hub Name of the transmitter 12. Ideally, 50,000 to 200,000 chips per symbol are generated to facilitate detection. Optional synchronous tracking module helps track down leaks by measuring leak proximity.

Figure 15:
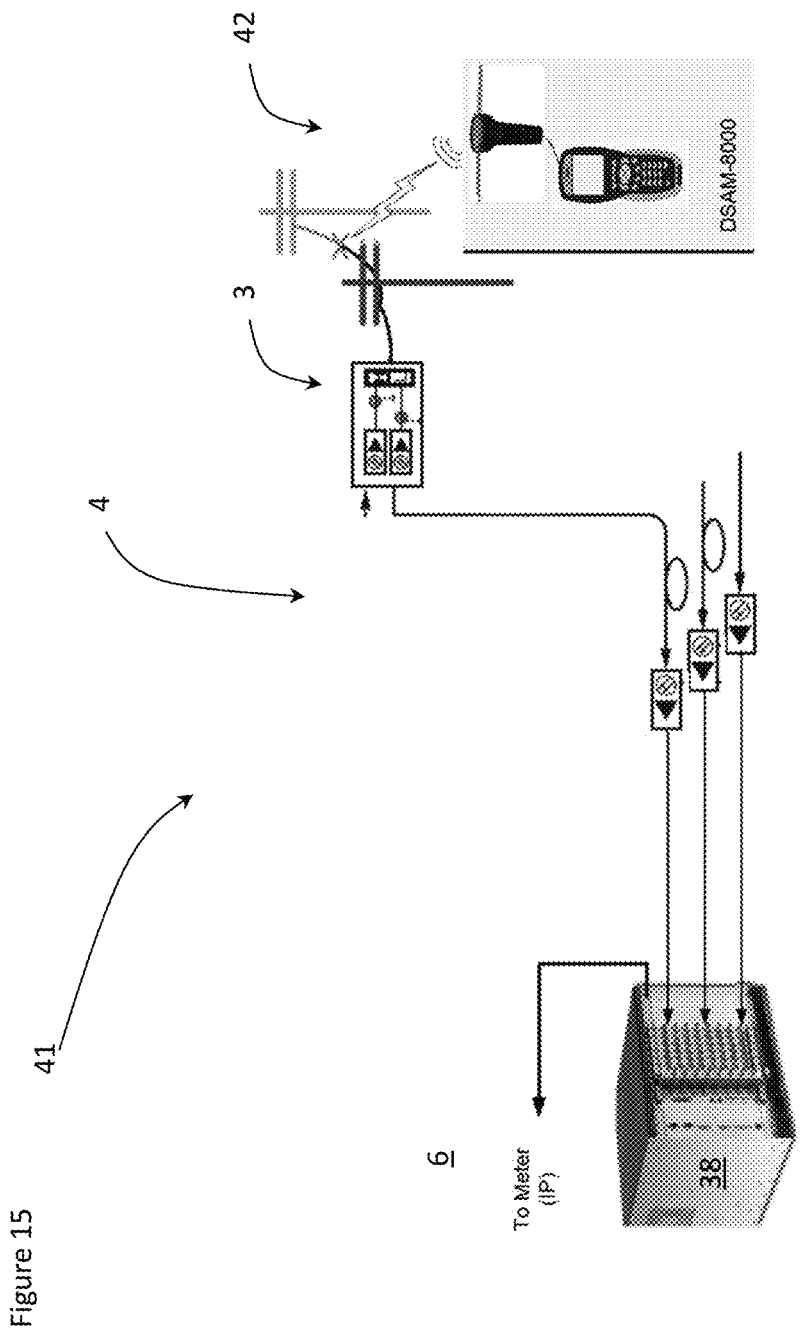
FIG. 15 illustrates a schematic diagram of a ingress detection system.

With reference to FIG. 15, the reverse (or upstream) set up 1, enables shielding fault detection system 41, i.e. egress, and location in a fully loaded upstream path. The first controller 42 transmits the aforementioned reverse sweep test signal below FCC Part 15 rule limits, so the system 41 can be operated as an unlicensed device. Again, a RPM 3000 receiver, or RPM 3000 expansion slot, may be used as the ingress detector and a second controller 38.

The ingress level can be sent from the receiver 38 back to the first controller 42 by IP (WiFi, cellular module, etc.) A modulated test signal provides a way to broadcast low bit rate ancillary data to the receiver 38, e.g at head end 6, such as meter IP or location, to pinpoint the point of ingress.

We claim:

1. An apparatus operable to test a cable network, the apparatus comprising:
   an interface to receive a multi-frequency test signal injected into the cable network at a first point, the test signal injected at a power level below that of active signals on the cable network, so as to substantially not disrupt transmission of the active signals; and
   a signal processor to detect power readings of the received multi-frequency test signal received at a second point in the cable network, wherein a frequency response of the cable network is operable to be generated based on the power readings.

2. The apparatus of claim 1, wherein the second point in the cable network is upstream from the first point.

3. The apparatus of claim 1, wherein the second point in the cable network is downstream from the first point.

4. The apparatus of claim 1, wherein the multi-frequency test signal is at least 30 dB below the active signals in the cable network.

5. The apparatus of claim 1, wherein the multi-frequency test signal is at or below a noise floor of the active signals on the cable network.

6. The apparatus of claim 1, wherein the multi-frequency test signal comprises a continuous sweep of carrier signals.

7. The apparatus of claim 1, wherein the multi-frequency test signal comprises a sweep of at least 100 carrier signals.

8. An apparatus operable to test a cable network, the apparatus comprising:
   a transmitter to transmit a multi-frequency test signal to the cable network at first point thereof at a power level below that of active signals on the cable network, so as to substantially not disrupt the transmission of the active signals, wherein a receiver is to detect power readings of the multi-frequency test signal to determine a frequency response of the cable network.

9. The apparatus of claim 8, wherein the receiver is to receive the multi-frequency test signal at a second point in the cable network that is upstream from the first point.

10. The apparatus of claim 8, wherein the receiver is to receive the multi-frequency test signal at a second point in the cable network that is downstream from the first point.

11. The apparatus of claim 8, wherein the multi-frequency test signal is at least 30 dB below the active signals in the cable network.

12. The apparatus of claim 8, wherein the multi-frequency test signal is at or below a noise floor of the active signals on the cable network.

13. The apparatus of claim 8, wherein the multi-frequency test signal comprises a continuous sweep of carrier signals.

14. The apparatus of claim 8, wherein the multi-frequency test signal comprises a sweep of at least 100 carrier signals.

15. The apparatus of claim 8, wherein the multi-frequency test signal comprises unmodulated carrier signals.

16. The apparatus of claim 8, wherein the multi-frequency test signal comprises modulated carrier signals.

17. A system for testing a cable network, the system comprising:
   a transmitter to insert a multi-frequency test signal into the cable network at a first point at a power level below that of active signals on the cable network, so as to substantially not disrupt transmission of the active signals; and
   a receiver to detect power readings of the multi-frequency test signal received at a second point of the cable network, wherein the frequency response is operable to be generated based on the power readings.

18. The system of claim 17, wherein the multi-frequency test signal is at least 30 dB below the active signals in the cable network.

19. The system of claim 17, wherein the multi-frequency test signal is at or below a noise floor of the active signals on the cable network.

20. The system of claim 17, wherein the multi-frequency test signal comprises a continuous sweep of carrier signals spaced between 100 kHz and 500 KHz apart.

* * * * *